United States Patent Office 2,802,822
Patented Aug. 13, 1957

2,802,822

HETEROCYCLIC ESTERS AND THE PREPARATION THEREOF

John Lee, Essex Fells, and Albert Ziering, Nutley, N. J., assignors to Hoffmann-La Roche Inc., Roche Park, Nutley, N. J., a corporation of New Jersey No Drawing. Application March 23, 1956, Serial No. 573,312

9 Claims. (Cl. 260—239)

This invention relates to novel chemical compounds and to novel processes and novel intermediates useful in the preparation thereof.

An important aspect of the invention relates to the base 1-methyl-3-allyl-4-phenyl-4-propionoxy-azacycloheptane and to acid addition salts thereof. This base and its acid addition salts are useful as medicinals, more particularly as analgesic compounds. Another aspect of the invention relates to novel processes useful in making the above identified base and acid addition salts. Still a further aspect of the invention relates to novel intermediates useful in the preparation of the above identified base and acid addition salts.

A comprehensive embodiment of the invention can be represented in terms of the following flow sheet, wherein R represents a lower alkyl radical and M represents a monovalent radical selected from the class consisting of Li and Mg-halide radicals. The numbering of the azacycloheptane ring, represented in Formula VI, is that established as System No. 252 in "The Ring Index" by Patterson and Capell (New York, 1940).

FLOW SHEET

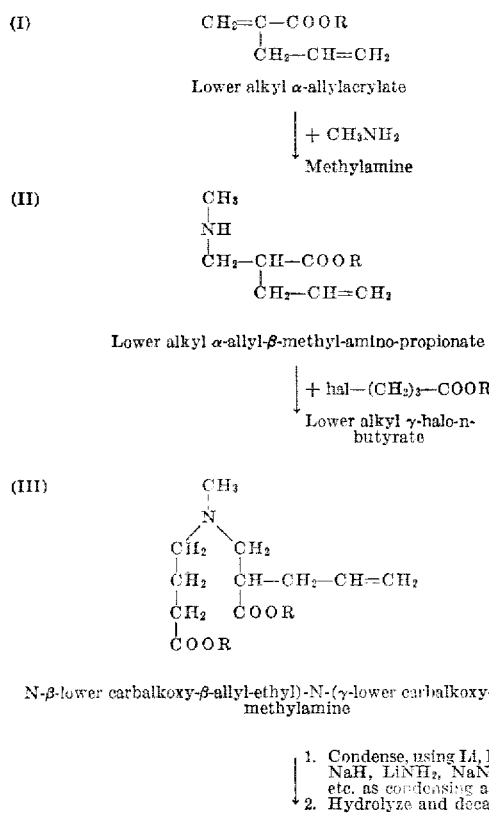

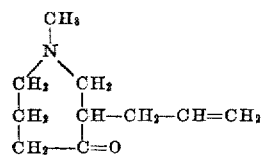

1-methyl-3-allyl-4-azacycloheptanone $$\Big| \begin{array}{l} 1.\ C_6H_5\text{—}M \\ 2.\ \text{Hydrolyze} \end{array}$$

Organometallo-phenyl compound

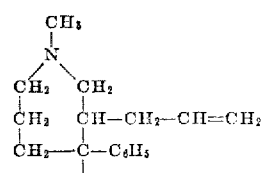

1-methyl-3-allyl-4-phenyl-4-azacycloheptanol $$\Big\downarrow (CH_3CH_2CO)_2O$$

Propionic anhydride

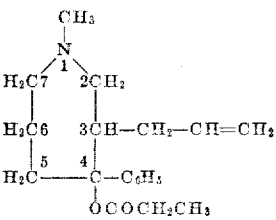

1-methyl-3-allyl-4-phenyl-4-propionoxy-azacycloheptane

In the embodiment graphically represented by the above flow sheet, the invention provides a process for making 1-methyl-3-allyl-4-phenyl-4-propionoxy-azacycloheptane which comprises the steps of condensing lower alkyl α-allylacrylate (I) with methylamine thereby producing lower alkyl α-allyl-β-methylaminopropionate (II); condensing the latter with lower alkyl γ-halo-n-butyrate thereby producing N-(β-lower carbalkoxy-β-allyl-ethyl)-N-(γ-lower carbalkoxy-n-propyl)-methylamine (III); subjecting the latter to ring closure thereby producing 1-methyl-3-allyl-4-azacycloheptanone (IV); reacting the latter with an organometallo-phenyl compound, $C_6H_5$—M, wherein M has the meaning above defined, and hydrolyzing thereby producing 1-methyl-3-allyl-4-phenyl-4-azacycloheptanol (V); and reacting the latter with a propionylating agent thereby producing 1-methyl-3-allyl-4-phenyl-4-propionoxy-azacycloheptane (VI).

A preferred form of the process described in the flow sheet comprises condensing ethyl α-allylacrylate with methylamine thereby producing ethyl α-allyl-β-methylaminopropionate; condensing the latter with ethyl γ-bromo-n-butyrate thereby producing N-(β-carbethoxy-β - allyl - ethyl) - N - (γ - carbethoxy - n - propyl) - methylamine; subjecting the latter to ring closure by heating in the presence of potassium thereby producing carbethoxy - 1 - methyl - 3 - allyl - 4 - azacycloheptanone; heating the latter in dilute aqueous acidic medium with a mineral acid (preferably dilute aqueous hydrochloric acid or hydrobromic acid) thereby producing an addition salt of 1-methyl-3-allyl-4-azacycloheptanone with said mineral acid; neutralizing said acid addition salt of 1-methyl-3-allyl-4-azacycloheptanone thereby releasing the free base; condensing the resulting 1-methyl-3-allyl-4-azacycloheptanone with phenyl lithium and hydrolyzing the resulting lithiumoxy condensation product thereby producing 1- methyl-3-allyl-4-phenyl-4-azacycloheptanol; and reacting 1-methyl-3-allyl-4-phenyl-4-azacycloheptanol with propionic anhydride thereby producing 1-methyl-3-allyl-4-phenyl-4-propionoxy-azacycloheptane.

1-methyl-3-allyl-4-phenyl-4-propionoxy-azacycloheptane, Formula VI above, is a base which readily forms acid addition salts with acids. Particularly preferred for use in medicinal compositions are the acid addition salts of said base of Formula VI with non-toxic acids of the type conventionally employed in the preparation of medicinally acceptable salts of pharmacologically active bases; e. g. strong mineral acids, such as hydrochloric acid, hydrobromic acid, nitric acid, sulfuric acid and phosphoric acid, and organic acids such as acetic acid, palmitic acid, maleic acid, tartaric acid, citric acid, d-camphorsulfonic acid, ethanesulfonic acid, and the like.

The bases represented by Formulas II, III, IV and V above likewise form acid addition salts with acids. The acids ordinarily preferred to form addition salts when using these bases as intermediates, e. g. in procedures for purifying or characterizing said base intermediates, are acids which yield well crystallized acid addition salts, such as hydrochloric, hydrobromic, nitric, sulfuric and phosphoric acids, oxalic acid, picric acid, etc. When effecting resolution of optical antipodes, it is of course desirable to use optically active organic acids, e. g. d- or l-tartaric acid, d-camphorsulfonic acid, etc.

The base represented by Formula IV in the above flow sheet has a center of asymmetry at carbon atom 3. The bases represented by Formulas V and VI in the above flow sheet have two centers of asymmetry at carbon atoms 3 and 4. Accordingly, all of these bases, and the acid addition salts derived therefrom, can exist in a number of stereoisomeric forms. It should be understood that the invention embraces generically all of the stereoisomeric forms of the novel compounds graphically represented in the above flow sheet.

The invention is further disclosed in the following examples, which are illustrative but not limitative thereof. Temperatures are stated in degrees centigrade, uncorrected.

*Example 1*

248 g. of ethyl α-allylacrylate was added to a solution of 60 g. of methylamine in 1 liter of absolute ethanol. The solution was heated in an autoclave under an atmosphere of 600 lbs. per square inch of nitrogen at 105° for 5 hours. The ethanol was then removed from the reaction mixture and the residual product was fractionated. Ethyl α-allyl-β-methylamino-n-propionate was collected in the fraction boiling at 103°–107°/31 mm.; $n_D^{25}$=1.4416.

*Example 2*

207 g. of ethyl α-allyl-β-methylamino-n-propionate, 236 g. of ethyl γ-bromo-n-butyrate and 167 g. of finely powdered anhydrous potassium carbonate were mixed with 500 cc. of benzene and the mixture was refluxed with stirring for 24 hours. At the end of this period, the suspended matter was filtered off, the benzene was removed by distillation and the residue was distilled in vacuum. The product, N-(β-carbethoxy-β-allyl-ethyl)-N-(γ-carbethoxy-n-propyl)-methylamine, distilled at 139°–140°/1 mm.

*Example 3*

103 g. of N-(β-carbethoxy-β-allyl-ethyl)-N-(γ-carbethoxy-n-propyl)-methylamine was added dropwise to a suspension of 14 g. of powdered potassium in 500 cc. of toluene at 100°. After the addition, the mixture was refluxed for one hour. The reaction mixture was then cooled and 180 cc. of aqueous hydrochloric acid (18% HCl by weight) was added. The toluene layer was separated and the aqueous solution was refluxed for 6 hours. It was then evaporated to a thick paste and made strongly alkaline with aqueous sodium hydroxide solution (50% by weight NaOH). The separated base was extracted with diethyl ether and dried over potassium carbonate. The ether was removed from the dried solution and the residue was distilled in vacuum. The product, 1-methyl-3-allyl-4-azacycloheptanone, boiled at 123°–124°/35 mm.

1.7 g. of 1-methyl-3-allyl-4-azacycloheptanone was dissolved in 5 cc. of ethanol. A saturated solution of picric acid in ethanol was added dropwise to the ethanolic solution of the ketone until further addition of picric acid produced no additional turbidity. The oily material that first formed turned crystalline. It was then filtered off and the material was recrystallized from ethanol, yielding 1-methyl-3-allyl-4-azacycloheptanone picrate, M. P. 138°–139°.

*Example 4*

19.5 g. of 1-methyl-3-allyl-4-azacycloheptanone was added dropwise to a solution of phenyl lithium made from 2.45 g. of lithium and 24.7 g. of bromobenzene in 150 cc. of diethyl ether. The addition was carried out at 5° and the mixture was stirred for a further hour after the addition. 100 cc. of water was then added, and the ether layer was separated and dried. The ether was removed and the residue was distilled in vacuum. The product, 1-methyl-3-allyl-4-phenyl-4-azacycloheptanol, distilled at 142°/5 mm. The material thus obtained was dissolved in petroleum ether and on standing crystallized, M. P. 76°–77°.

1.2 g. of 1-methyl-3-allyl-4-phenyl-4-azacycloheptanol was dissolved in 35 cc. of dry diethyl ether and hydrogen chloride gas was bubbled in until there was no further precipitation. The precipitate was filtered off and recrystallized from acetone, yielding 1-methyl-3-allyl-4-phenyl-4-azacycloheptanol hydrochloride, M. P. 172°–173°.

*Example 5*

6.7 g. of 1-methyl-3-allyl-4-phenyl-4-azacycloheptanol was dissolved in 25 cc. of propionic anhydride and the mixture was warmed on a steam bath for 3 hours. The excess propionic anhydride was distilled off in vacuum and the residue was taken up in diethyl ether. The ether solution was washed with aqueous sodium carbonate solution (10% Na₂CO₃ by weight) and then with water. It was then dried and hydrogen chloride gas was bubbled in. The precipitate was filtered off and recrystallized from a mixture of ethyl acetate and acetone, yielding 1-methyl-3-allyl-4-phenyl-4-propionoxy-azacycloheptane hydrochloride, M. P. 142°–143°.

3.7 g. of the last mentioned hydrochloride was dissolved in 25 cc. of water and 15 cc. of an aqueous solution of sodium carbonate (containing 10% by weight Na₂CO₃) was added. The liberated base was extracted with diethyl ether and the ether solution was dried over anhydrous potassium carbonate. The ether solution was filtered and the solvent was distilled off. The residue was distilled in vacuum, yielding 1-methyl-3-allyl-4-phenyl-4-propionoxy-azacycloheptane, B. P. 152°/0.5 mm.

A saturated solution of picric acid in ethanol was added dropwise to 1.7 g. of 1-methyl-3-allyl-4-phenyl-4-propionoxy-azacycloheptane in 5 cc. of ethanol, until a turbidity no longer formed upon further addition of the picric acid. The oily material which precipitated was crystallized by scratching the vessel with a glass rod. The crystalline precipitate was filtered off and recrystallized from acetic acid, yielding 1-methyl-3-allyl-4-phenyl-4-propionoxy-azacycloheptane picrate, M. P. 165°–166°.

0.30 g. of 1-methyl-3-allyl-4-phenyl-4-propionoxy-azacycloheptane was added to a solution of 0.15 g. of d-tartaric acid in 25 cc. of acetone. The acetone was distilled off, leaving a viscous residue of 1-methyl-3-allyl-4-phenyl-4-propionoxy-azacycloheptane d-tartrate.

0.30 g. of 1-methyl-3-allyl-4-phenyl-4-propionoxy-azacycloheptane was added to a solution of 0.11 g. of maleic acid in 25 cc. of acetone. The acetone was distilled off, leaving an oily residue of 1-methyl-3-allyl-4-phenyl-4-propionoxy-azacycloheptane maleate.

We claim:

1. A compound selected from the group consisting of 1 - methyl - 3 - allyl - 4 - phenyl - 4 - propionoxy - azacycloheptane and medicinally acceptable acid addition salts thereof.

2. 1-methyl-3-allyl-4-phenyl-4-propionoxy-azacycloheptane.

3. A medicinally accepted acid addition salt of a compound according to claim 3.

4. A compound selected from the group consisting of 1-methyl-3-allyl-4-phenyl-4-azacycloheptanol and well crystallized acid addition salts thereof.

5. A process of making 1-methyl-3-allyl-4-phenyl-4-azacycloheptanol which comprises reacting 1-methyl-3-allyl-4-azacycloheptanone with an organometallo-phenyl compound and hydrolyzing.

6. A compound selected from the group consisting of 1-methyl-3-allyl-4-azacycloheptanone and well crystallized acid addition salts thereof.

7. A compound selected from the group consisting of N-(β-lower carbalkoxy-β-allyl-ethyl)-N-(γ-lower carbalkoxy-n-propyl)-methylamine and well crystallized acid addition salts thereof.

8. A process of making N-(β-lower carbalkoxy-β-allyl - ethyl) - N - (γ - lower carbalkoxy - n - propyl)-methylamine which comprises condensing lower alkyl α-allyl-β-methylamino-propionate with lower alkyl γ-halo-n-butyrate.

9. A process which comprises condensing lower alkyl α-allylacrylate with methylamine thereby producing lower alkyl α-allyl-β-methylaminopropionate; condensing the latter with lower alkyl γ-halo-n-butyrate thereby producing N-(β-lower carbalkoxy-β-allyl-ethyl)-N-(γ-lower carbalkoxy-n-propyl)-methylamine; subjecting the latter to ring closure thereby producing 1 - methyl - 3 - allyl - 4 - azacycloheptanone; reacting the latter with an organometallo-phenyl compound and hydrolyzing thereby producing 1-methyl-3-allyl-4-phenyl-4-azacycloheptanol; and reacting the latter with a propionylating agent thereby producing 1-methyl-3-allyl-4-phenyl-4-propionoxy-azacycloheptane.

References Cited in the file of this patent
UNITED STATES PATENTS

| 2,666,050 | Diamond et al. | Jan. 12, 1954 |
| 2,740,777 | Diamond et al. | Apr. 3, 1956 |
| 2,740,780 | Diamond et al. | Apr. 3, 1956 |

OTHER REFERENCES

Blicke et al.: J. Am. Chem. Soc., vol. 75, pp. 3999–4002 (1953).

UNITED STATES PATENT OFFICE
Certificate of Correction

Patent No. 2,802,822                                                            August 13, 1957

John Lee et al.

It is hereby certified that error appears in the printed specification of the above numbered patent requiring correction and that the said Letters Patent should read as corrected below.

Column 1, line 66, for "N-β-lower" read —N-(β-lower—; line 68, for "LiH'" read —LiH,—; column 4, line 60, for "cryctallized" read —crystallized—; column 5, line 7, for "accepted" read —acceptable—; line 8, for the claim reference numeral "3" read —2—.

Signed and sealed this 8th day of October 1957.

[SEAL]

Attest:
KARL H. AXLINE,
*Attesting Officer.*

ROBERT C. WATSON,
*Commissioner of Patents,*